(12) United States Patent
Xie et al.

(10) Patent No.: US 10,656,735 B2
(45) Date of Patent: May 19, 2020

(54) TOUCH PANEL, MANUFACTURING METHOD, AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Xiaodong Xie, Beijing (CN); Ming Hu, Beijing (CN); Ming Zhang, Beijing (CN); Qingpu Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/741,357

(22) PCT Filed: Jul. 24, 2017

(86) PCT No.: PCT/CN2017/092193
§ 371 (c)(1),
(2) Date: Jan. 2, 2018

(87) PCT Pub. No.: WO2018/032902
PCT Pub. Date: Feb. 22, 2018

(65) Prior Publication Data
US 2020/0081561 A1 Mar. 12, 2020

(30) Foreign Application Priority Data
Aug. 15, 2016 (CN) .......................... 2016 1 0671867

(51) Int. Cl.
*G06F 3/041* (2006.01)
*G02B 1/14* (2015.01)
*G02B 5/00* (2006.01)

(52) U.S. Cl.
CPC ............... *G06F 3/041* (2013.01); *G02B 1/14* (2015.01); *G02B 5/003* (2013.01); *G06F 2203/04103* (2013.01)

(58) Field of Classification Search
CPC ................................. G02F 1/133; G06F 3/044
See application file for complete search history.

(56) References Cited

U.S. PATENT DOCUMENTS

2016/0117032 A1* 4/2016 Lin .......................... G06F 3/041
  345/173
2016/0357059 A1* 12/2016 Xu ..................... G02F 1/133512

FOREIGN PATENT DOCUMENTS

CN 104123054 A 10/2014

OTHER PUBLICATIONS

International Search Report and Written Opinion dated Sep. 28, 2017 in PCT/CN2017/092193.

* cited by examiner

*Primary Examiner* — Sepehr Azari
(74) *Attorney, Agent, or Firm* — Syncoda LLC; Feng Ma

(57) ABSTRACT

A touch panel is disclosed, which includes a substrate, a black matrix layer, and an insulating layer. The black matrix is over the substrate, the insulating layer is over the black matrix layer, and an edge of the insulating layer has a longer distance to an edge of the substrate on a same side of the touch panel than an edge of the black matrix layer on the same side of the touch panel. The touch panel further includes a protecting layer over the insulating layer, configured such that an edge of the protecting layer on the same side of the touch panel has a longer distance to the edge of (Continued)

the substrate than the edge of the insulating layer. A manufacturing method of the touch panel, and a display apparatus containing the touch panel, are also disclosed.

16 Claims, 3 Drawing Sheets

TOUCH PANEL, MANUFACTURING METHOD, AND DISPLAY APPARATUS

CROSS-REFERENCE TO RELATED APPLICATION

The present application claims priority to Chinese Patent Application No. 201610671867.9 filed on Aug. 15, 2016, the disclosure of which is hereby incorporated by reference in its entirety.

TECHNICAL FIELD

The present disclosure relates generally to a field of display technologies, and specifically to a touch panel and a manufacturing method thereof, and a display apparatus containing the touch panel.

BACKGROUND

Because touch panels can be used to realize simple, convenient and natural human-machine interactions, touch panels are widely applied in human life.

A touch panel generally comprises a substrate, a black matrix layer, a bridging layer, an insulating layer, an electrode layer, and a protecting layer. The black matrix layer, the bridging layer, the insulating layer, the electrode layer, and the protecting layer are successively disposed or overlaid over the substrate.

The electrode layer typically includes a plurality of driving electrode lines extending in a horizontal direction and a plurality of sensing electrode lines extending in a vertical direction. The driving electrode lines are insulated from the sensing electrode lines at the intersections where they stagger. The bridging layer usually comprises a plurality of bridging electrodes, each bridging electrode configured to electrically connect the driving electrode lines that are disconnected. The insulating layer is employed to maintain an insulation between the driving electrode lines and the sensing electrode lines.

During a conventional manufacturing process of touch panels, each of the film layers that are employed for fabricating touch panels is sequentially fabricated over a substrate with a relatively large area (usually called a master substrate), then the master substrate is cut into smaller pieces having specific shapes and sizes to thereby obtain multiple individual touch panels.

SUMMARY

The present disclosure provides a touch panel and a manufacturing method, and a display apparatus.

In a first aspect, the present disclosure provides a touch panel, which includes a substrate, a black matrix layer, and an insulating layer.

The black matrix is disposed over the substrate, and the insulating layer is disposed over the black matrix layer. It is configured such that an edge of the insulating layer has a longer distance to an edge of the substrate on a same side of the touch panel than an edge of the black matrix layer on the same side of the touch panel.

According to some embodiments of the touch panel, a distance between the edge of the insulating layer and the edge of the black matrix layer is around 20-50 μm.

According to some embodiments of the touch panel, a thickness of the insulating layer is around 1.3-1.7 μm.

The touch panel as described above can further include a protecting layer, which is disposed over the insulating layer. The protecting layer is configured such that an edge of the protecting layer on the same side of the touch panel has a longer distance to the edge of the substrate than the edge of the insulating layer.

In the embodiments of the touch panel including a protecting layer as described above, a distance between the edge of the protecting layer and the edge of the insulating layer can be around 20-60 μm, a thickness of the protecting layer can be around 1.3-1.7 μm, and the protecting layer can be configured to be resistant to the hydrofluoric acid solution.

The touch panel as described above can further include a blanking layer, which is disposed between the insulating layer and the protecting layer. The blanking layer is configured to cover the edge of the insulating layer and the edge of the black matrix layer such that an edge of the blanking layer on the same side of the touch panel has a shorter distance to the edge of the substrate than the edge of the black matrix layer.

In the embodiments of the touch panel including a blanking layer as described above, the edge of the blanking layer can be substantially flush with the edge of the substrate, a thickness of the blanking layer can be around 850 Å-950 Å, and the blanking layer can have a composition of silicon oxynitride.

The touch panel as described above can further include a flattening layer, which is disposed on the black matrix layer and below the insulating layer. The flattening layer is configured to provide a flattened surface over the black matrix layer to thereby allow for formation of another film layer thereon.

In a second aspect, the present disclosure further provides a display apparatus. The display apparatus includes a touch panel according to any of the embodiments as described above.

In a third aspect, the present disclosure further provides a method for manufacturing a touch panel. The method includes the steps of:

providing a substrate;

forming a black matrix layer over the substrate; and forming an insulating layer over the black matrix layer, such that an edge of the insulating layer has a longer distance to an edge of the substrate on a same side of the touch panel than an edge of the black matrix layer on the same side of the touch panel.

According to some embodiments of the disclosure, the method further includes a step of:

forming a protecting layer over the insulating layer, such that an edge of the protecting layer on the same side of the touch panel has a longer distance to the edge of the substrate than the edge of the insulating layer.

According to some embodiments, between the step of forming an insulating layer over the black matrix layer and the step of forming a protecting layer over the insulating layer, the method further includes a step of:

forming a blanking layer over the insulating layer such that the blanking layer covers the edge of the insulating layer and the edge of the black matrix layer, and that an edge of the blanking layer on the same side of the touch panel has a shorter distance to the edge of the substrate than the edge of the black matrix layer.

Here in the above mentioned embodiments of the method, in the step of forming a blanking layer over the insulating layer, the edge of the blanking layer can be substantially flush with the edge of the substrate.

According to some embodiments, between the step of forming a black matrix layer over the substrate and the step of forming an insulating layer over the black matrix layer, the method further comprises a step of:

forming a flattening layer on the black matrix layer, wherein the flattening layer is configured to provide a flattened surface over the black matrix layer to thereby allow for formation of another film layer thereon.

Other embodiments of the touch panel, the display apparatus, and the method for manufacturing the touch panel can become obvious in light of the above disclosure.

BRIEF DESCRIPTION OF DRAWINGS

To more clearly illustrate some of the embodiments provided by the present disclosure, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way. It is noted that the described embodiments are merely a portion but not all of the embodiments of the invention. Based on the described embodiments of the invention, those ordinarily skilled in the art can obtain other embodiment(s), which come(s) within the scope sought for protection by the invention.

As mentioned above, in a conventional manufacturing process of touch panels, after each film layer is sequentially fabricated over a master substrate, the master substrate having the film layers is cut to thereby obtain multiple individual touch panels.

During the cutting process of the master substrate, because of the effects of cutting, the edges of each individual touch panel typically have defects such as being rough, having cracks, and/or having particles. These defects can cause a reduced strength of the touch panels, and as such the touch panels manufactured thereby need to be strengthened.

At present, there are two commonly employed approaches for strengthening touch panels manufactured by the above approach: chemical strengthening and physical strengthening. Among these two approaches, chemical strengthening is substantially an approach by corroding the edges of a touch panel with a hydrofluoric acid (HF) solution, such that the aforementioned defects of the edges of a touch panel (i.e., rough edges, cracks, and particles, etc.) can be overcome, thus leading to a relatively good resolving of the issue of poor strength associated with the touch panel.

During a chemical strengthening process, a touch panel needs to be immersed in the HF solution. In order to prevent the HF solution from corroding the film layers in the touch panel, an anti-acid protective film (termed protecting layer hereafter) is typically bonded to the front side and back side of the touch panel. However, in an actual manufacturing process of a touch panel, it is observed that the effects of touch panel protection through bonding the above mentioned protecting layer thereto is not quite satisfactory.

Figure 1:
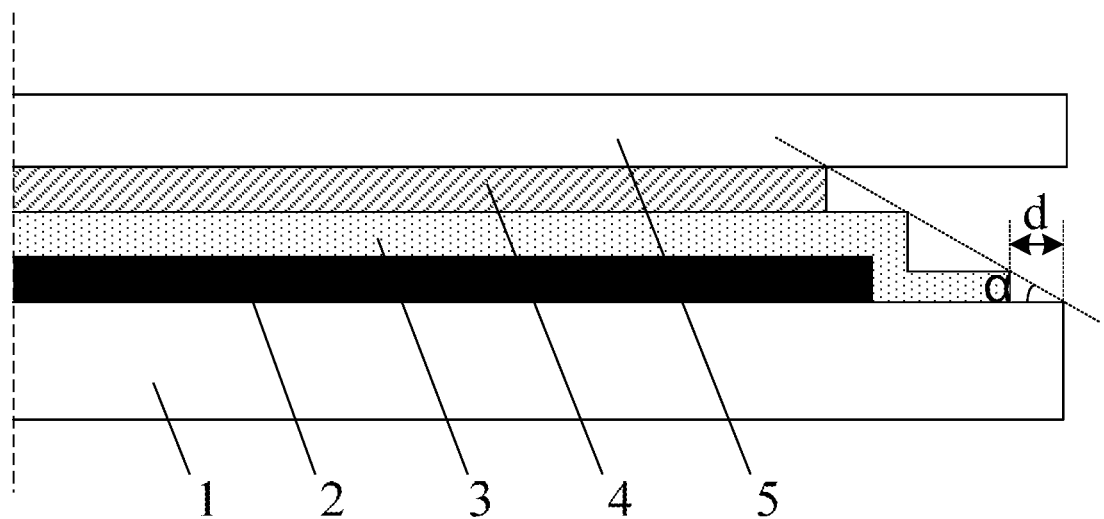
FIG. 1 is a side view of an edge of a conventional touch panel.

FIG. 1 illustrates a side view of a conventional touch panel. As shown in FIG. 1, in the conventional touch panel, a black matrix layer 2, an insulating layer 3 and a protecting layer 4, and a protecting layer 5 are sequentially disposed over the substrate 1. In the conventional touch panel, it is typically configured such that an edge of an insulating layer 3 extends beyond, and covers, an edge of a black matrix layer 2.

It is further configured such a distance d between an edge of the insulating layer 3 and an edge of the substrate 1 is relatively small. In addition, the black matrix layer 2, the insulating layer 3, and the protecting layer 4 are all configured to have a relatively large thickness. As such, the slope of the edge of the touch panel (as indicated by the angle α formed between the oblique line and an upper surface of the substrate 1 shown in FIG. 1) is relatively big.

As a consequence, the protecting layer 5 cannot be securely bonded at the edge of the touch panel. As such, there is usually a gap between the protecting layer 5 and the touch panel, causing that the HF solution can easily enter from the gap to thereby corrode the film layers at the edge of the touch panel. Corrosion of the film layers at the edge of the touch panel can cause problems such as light leakage, which in turn leads to a reduced yield rate of touch panels.

In order to address the above issue, in a first aspect, the present disclosure provides a touch panel.

Figure 2:
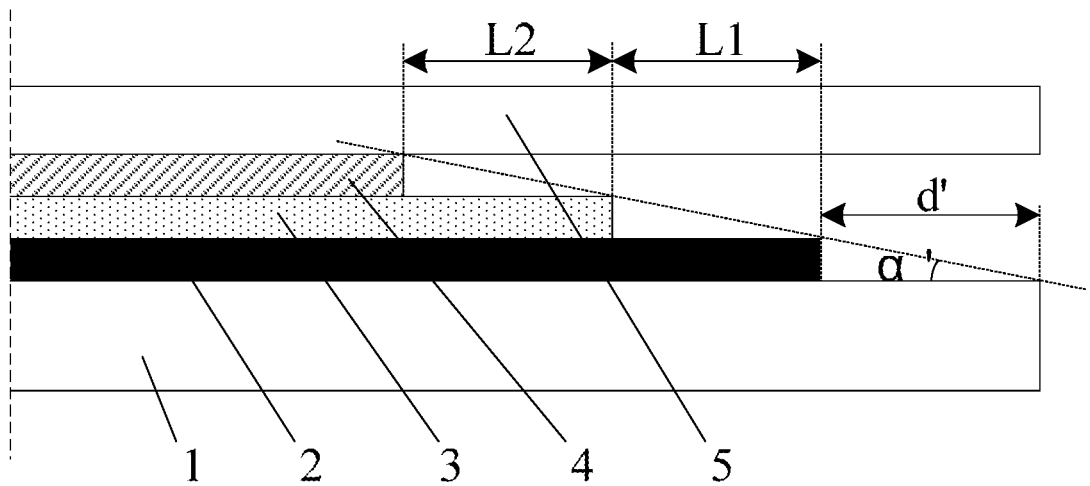
FIG. 2 is side view of an edge of a touch panel according to some embodiments of the present disclosure.

FIG. 2 illustrates a touch panel according to some embodiments of the present disclosure. As shown in FIG. 2, the touch panel comprises a substrate 1, a black matrix layer 2 that is disposed over the substrate 1, and an insulating layer 3 that is disposed over the black matrix layer 2.

An edge of the black matrix layer 2 is configured to extend beyond an edge of the insulating layer 3 on a same side of the touch panel (i.e. an edge of the insulating layer has a longer distance to an edge of the substrate on a same side of the touch panel than an edge of the black matrix layer on the same side of the touch panel), such that the edge of the insulating layer 3 and the edge of the black matrix layer 2 together form a first step-shaped structure. Herein the insulating layer 3 is referred to as a film layer configured to prevent electrical connection between driving lines and sensing lines of the touch panel.

Differing from a conventional touch panel, where the edge of the insulating layer 3 extends beyond, and covers, the edge of the black matrix layer 2 on the same side of the touch panel (i.e. the edge of the insulating layer 3 has a shorter distance to the edge of the substrate on the same side of the touch panel than the black matrix layer 2), in the embodiments of touch panel disclosed herein, the edge of the black matrix layer 2 extends beyond the edge of the insulating layer 3 on the same side (i.e. the edge of the insulating layer 3 has a longer distance to the edge of the substrate on the same side of the touch panel than the black matrix layer 2), such that the edge of the insulating layer 3 and the black matrix layer 2 form a step-shaped structure (i.e. the first step-shaped structure).

As such, because an area of the black matrix layer 2 is substantially unchanged, the edge of the insulating layer 3 in the aforementioned embodiments of the touch panel is substantially retracted. In other words, the edge of the film layer that is closest to the edge of the substrate 1 changes from the edge of the insulating layer in a conventional touch panel to the edge of the black matrix layer 2 in the touch panel disclosed herein.

The distance d' between the edge of the black matrix layer 2 and the edge of the substrate 1 is larger than the distance d between the edge of the insulating layer 3 and the edge of the substrate 1 in a conventional touch panel. The slope of the edge of the touch panel (as indicated by the angle α' formed between the oblique line and an upper surface of the substrate 1 in FIG. 2) is thus decreased, and as a result, when the protecting layer 5 is bonded to the touch panel for chemical strengthening, the protecting layer 5 can closely attach to the edge of the touch panel, effectively avoiding the corrosion to the edge of film layers of the touch panel by the HF solution, leading to an improvement of the yield rate for touch panel.

It should be noted that herein the "slope of the edge of the touch panel" is defined as follows: regarding a layered structure formed by each film layer over a substrate of a touch panel, the inclination of a connection line connecting each outer edge vertex of the layered structure and an outer edge vertex of the substrate relative to a plane of the substrate is defined as the slope of the edge of the touch panel.

For example, in a conventional touch panel as illustrated in FIG. 1, the slope of the edge of the touch panel is the inclination between the inclined dotted line in FIG. 1 and the plane of the substrate 1, which has a slope angle of a. In the embodiments of the touch panel as illustrated in FIG. 2, the slope of the edge of the touch panel is the inclination between the inclined dotted line in FIG. 2 and the plane of the substrate 1, which has a slope angle of α'. It is apparent that because the edge of the insulating layer 3 is retracted, α'<α, thus the slope of the edge of the touch panel is decreased.

According to some embodiments of the present disclosure, the distance L1 between the edge of the insulating layer 3 and the edge of the black matrix layer 2 is preferably 20 μm-50 μm. As such, the slope of the edge of the touch panel can be decreased, whereas the edge of the black matrix layer 2 is not be exposed too much.

The thickness of the insulating layer 3 can be about 1.3 μm-1.7 μm, and more preferably can be ~1.5 μm. In these embodiments of the touch panel, a distance between the edge of the insulating layer 3 and the edge of the substrate 1 is larger than a distance between the edge of the black matrix layer 2 and the edge of the substrate 1. Thus compared with the conventional touch panel as illustrated in FIG. 1, where the edge of the insulating layer 3 extends beyond, and covers, the edge of the black matrix layer 2, the edge of the insulating layer 3 disclosed herein is substantially retracted.

As a consequence, the slope of the edge of the touch panel is decreased. Because there is no need to reduce the slope of the edge of the touch panel by reducing a thickness of the insulating layer 3, the insulating layer 3 still has a good electric insulation.

With reference to FIG. 2, the touch panel further includes a protecting layer 4 over the insulating layer 3. The protecting layer 4 is disposed over an electrode layer of the touch panel and is configured to protect the electrode layer of the touch panel.

In these embodiments of the touch panel, the protecting layer 4 is configured such that a distance between the edge of the protecting layer 4 and the edge of the substrate 1 on the same side of the touch panel is larger than a distance between the edge of the insulating layer 3 on the same side of the touch panel and the edge of the substrate 1 (i.e. the edge of the protecting layer 4 is retracted). As such, the edge of the protecting layer 4 and the edge of the insulating layer 3 together form a second step-shaped structure.

Compared with a conventional touch panel, because the edge of the protecting layer 4 has a larger distance to the edge of the substrate 1 on the same side of the touch panel than the edge of the insulating layer 3 on the same side, therefore in these embodiments of the touch panel, the edge of the protecting layer 4 is also retracted compared with a conventional touch panel.

As such, in a top-to-bottom order at the edge of the touch panel as illustrated in FIG. 2, the edge of the protecting layer 4, the edge of the insulating layer 3, and the edge of the black matric layer 2 together substantially form a step-shaped structure.

Such a step-shaped structure substantially causes that the edge of the touch panel has a relatively small slope, which in turn causes the protecting layer 5 to have a relatively more secure bonding with the edge of the touch panel once it is formed over the top surface of the touch panel that has the black matric layer 2, the insulating layer 3, and the protecting layer 4 already formed over the substrate.

Because of the relatively more secure bonding of the protecting layer 5 onto the edge of the touch panel, the chances of forming a gap between the protecting layer 4 and the substrate are reduced. Consequently, during a subsequent chemical strengthening of the touch panel to the edge film layers of the touch panel, the chances that the acid solution (such as HF solution) employed for chemical strengthening goes through the gap to thereby corrode the film layers in the touch panel can be reduced, and the issue of acid-mediated corrosion can thus be effectively prevented.

In these embodiments of the touch panel as described above, the distance L2 between the protecting layer 4 and the insulating layer 3 is preferably 20 μm-60 μm, so that the slope of the edge of the touch panel can be effectively reduced while the electrode layer underneath the protecting layer 4 can be effectively protected.

In a preferred embodiment, the distance L1 between the edge of the insulating layer 3 and the edge of the black matrix layer 2 can be 20 μm, and the distance L2 between the edge of the protecting layer 4 and the edge of the insulating layer 3 can be 60 μm. A thickness of the protecting layer 4 is about 1.3 μm-1.7 μm, and more preferably, about 1.5 μm.

In these embodiments of the touch panel, because the slope of the edge of the touch panel is further reduced by retracting the protecting layer 4 that is disposed over the insulating layer 3 as illustrated in FIG. 2, there is no need to reduce the slope of the edge of the touch panel by reducing a thickness of the protecting layer 4. As such, damages to the electrode layer caused by materials in the environment, such as water, oxygen, etc., can be effectively prevented.

Figure 3:
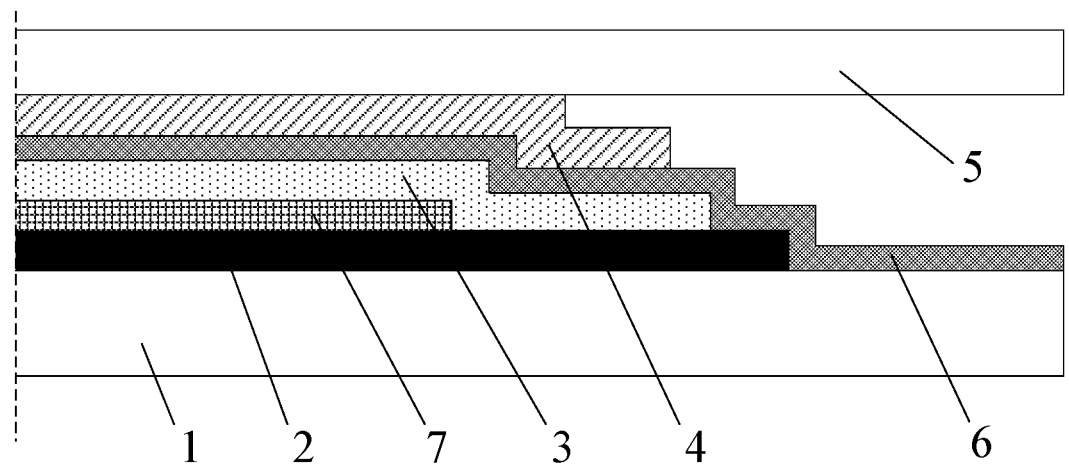
FIG. 3 is side view of an edge of a touch panel according to some other embodiments of the present disclosure.

As shown in FIG. 3, the touch panel based on some embodiments of the present disclosure further comprises a blanking layer 6 between the insulating layer 3 and the protecting layer 4. The edge of the blanking layer 6 covers the edge of the black matrix layer 2, and can extend towards the edge of the substrate 1 to thereby be substantially flush with the edge of the substrate 1.

The blanking layer 6 covers the black matrix layer 2, and can thus protect the black matrix layer 2. The blanking layer 6 can have a composition of silicon oxynitride (SiNO). A thickness of the blanking layer does not need to be too large, and preferably the thickness can be 850 Å-950 Å, or more preferably can be 900 Å, therefore it will not have a big impact to the slope of the edge of the touch panel. It should be noted that the blanking layer in the touch panel is configured to ensure that human eyes cannot see a pattern of the electrode layer and bridging layer in the touch panel.

With reference to FIG. 3, in the touch panel as described above, because the black matrix layer 2 is a patterned film layer, in order to improve the quality of each film layer subsequently formed over the black matrix layer 2, a flattening layer 7 can preferably be disposed over the black matrix layer 2, so that the surface of the black matrix layer 2 can have a flattened surface for allow for subsequent manufacturing of the film layers thereover.

In these embodiments, the touch panel further includes a bridging layer and an electrode layer. The bridging layer is disposed between the black matrix layer 2 and the insulating layer 3, and comprises a plurality of bridging electrodes. The electrode layer is disposed between the insulating layer 3 and the protecting layer 4, and comprises a plurality of first electrode lines extending in a horizontal direction and a plurality of second electrode lines extending in a vertical direction, wherein the first electrode lines and the second electrode lines are disconnected at the intersections where they stagger.

The insulating layer 3 is disposed between the bridging layer and the electrode layer, and is provided with a plurality of vias. Though the vias, the two ends of the bridging electrodes in the bridging layer are electrically connected to the disconnected ends of the first electrode lines in the electrode layer such that each first electrode line is connected.

It is noted that in the embodiment of the touch panel as described above, the first electrode lines can be driving lines needed for touch control, and the second electrode lines can be the sensing lines needed for touch control; or alternatively, the first electrode lines can be sensing lines needed for touch control, and the second electrode lines can be driving lines needed for touch control.

In addition, in order to apply electric signals to the first electrode lines and the second electrode lines to achieve the touch-control function, the touch panel can further comprise a peripheral lead wiring layer, disposed between the electrode layer and the protecting layer 4. The peripheral lead wiring layer comprises a plurality of peripheral lead lines that are disposed in a peripheral region of the touch panel. Each peripheral lead line is configured to be connected to one first electrode line or one second electrode line, such that an electric signal can be transmitted to a corresponding electrode line through a corresponding peripheral lead line. The peripheral lead lines preferably have a composition of a metal.

It should be noted that in FIG. 2 and FIG. 3, only a layered structure in the edge of the touch panel is illustrated, and that a layered structure of the touch panel at a display region is not illustrated in the figures.

In the following, the layered structure of the film layers the touch panel is further described using an illustrating example with reference to FIG. 4.

Figure 4:
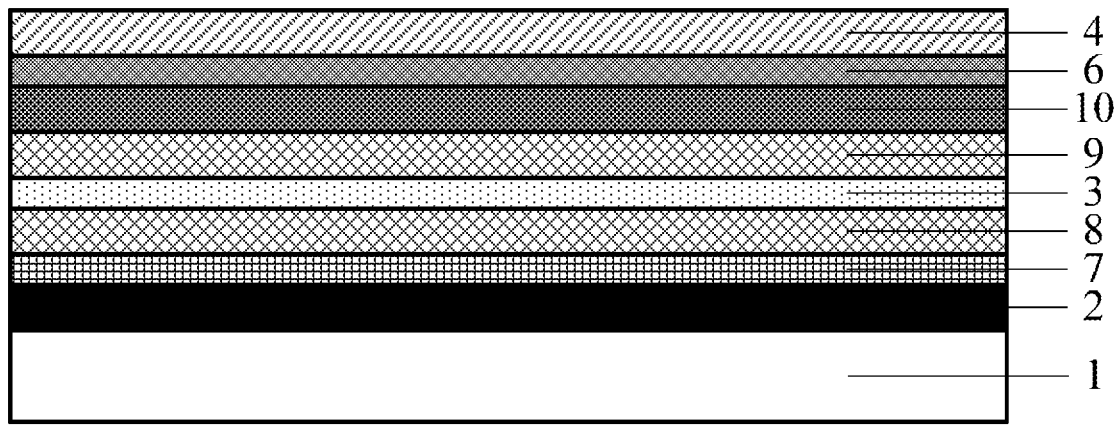
FIG. 4 is a side view of a display region of a touch panel according to some embodiments of the present disclosure.

As shown in FIG. 4, in a direction from far from the substrate 1 to close to the substrate 1, the film layers that are disposed over the substrate 1 include: a protecting layer 4, a blanking layer 6, a peripheral lead wiring layer 10, an electrode layer 9, an insulating layer 3, a bridging layer 8, a flattening layer 7, and a black matrix layer 2.

The thickness of each of the aforementioned film layers can be designed based on practical needs. In one illustrating embodiment, the thickness of the protecting layer 4 is 1.5 μm, the thickness of the blanking layer 6 is 900 Å, the thickness of the peripheral lead wiring layer 10 is 3000 Å, the thickness of the electrode layer 9 is 450 Å, the thickness of the insulating layer 3 is 1.5 μm, the thickness of the bridging layer 8 is 900 Å, the thickness of the flattening layer 7 is 0.7 μm, and the thickness of the black matrix layer 2 is 1.5 μm. In addition, the thickness of the substrate 1 can be 0.7 mm.

It should be mentioned that this above example represents only one embodiment of the touch panel, and shall not limit the scope of the present disclosure.

In a second aspect, this present disclosure further provides a display apparatus.

The display apparatus comprises a touch panel according to any one of the embodiments as described above. In addition, the display apparatus further comprises a display panel, which is overlaid with the touch panel.

Because of the design of the edges of the film layers of the touch panel, the corrosion of the edge film layers of the touch panel by the HF solution is effectively avoided, and the yield rate of the touch panel is improved. Therefore, the yield rate of the display apparatus comprising the touch panel is also improved.

In a third aspect, the present disclosure further provides a method for manufacturing a touch panel. The touch panel is based on any of the embodiments as described above. The method comprises the following steps:

providing a substrate;

forming a black matrix layer over the substrate;

forming an insulating layer over the black matrix layer, such that an edge of the insulating layer has a longer distance to an edge of the substrate on a same side of the touch panel than an edge of the black matrix layer on the same side of the touch panel.

Herein by the above mentioned steps, it substantially realizes that the edge of the insulating layer, the edge of the black matrix layer, and the edge of the substrate form a first step-shaped structure.

Due to the presence of the step-shaped structure at the edge of the touch panel, in the subsequent step of chemical strengthening using an acid solution (such as HF solution), the chances of the acid solution to go through a gap to thereby corrode the film layers in the touch panel can be reduced, and the issue of acid-mediated corrosion can thus be effectively prevented.

According to some embodiments, the method can further include a step of:

forming a protecting layer over the insulating layer, such that an edge of the protecting layer on the same side of the touch panel has a longer distance to the edge of the substrate than the edge of the insulating layer.

By means of this step, the edge of the protecting layer, the edge of the insulating layer, and the edge of the black matrix layer substantially form a second step-shaped structure.

The presence of both the first step-shaped structure and the second step-shaped structure allows that the edge of the touch panel has a relatively small slope, which further allows the protecting layer to have a relatively more secure bonding with the edge of the substrate. This can reduce the chances of the acid solution to go through a gap to thereby corrode the film layers in the touch panel can be reduced, and the issue of acid-mediated corrosion can thus be effectively prevented.

In some embodiments, between the step of forming an insulating layer over the black matrix layer and the step of forming a protecting layer over the insulating layer, the method further comprises:

forming a blanking layer over the insulating layer such that the blanking layer covers the edge of the insulating layer and the edge of the black matrix layer, and that an edge of the blanking layer on the same side of the touch panel has a shorter distance to the edge of the substrate than the edge of the black matrix layer.

In some embodiments, between the step of forming a black matrix layer over the substrate and the step of forming an insulating layer over the black matrix layer, the method further comprises:

forming a flattening layer on the black matrix layer, wherein the flattening layer is configured to provide a flattened surface over the black matrix layer to thereby allow for formation of another film layer thereon.

According to some embodiments of the method, the flattening layer is configured to be flush with the edge of the substrate It should be noted that the display apparatus in the embodiment can be any product or component with a display function, such as a liquid crystal display (LCD) panel, an electronic paper, an organic light-emitting diode (OLED) panels, a mobile phone, a tablet, a television, a monitor, a notebook, a digital frame, and a navigator.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A touch panel, comprising:
   a substrate;
   a black matrix layer over the substrate; and
   an insulating layer over the black matrix layer;
   wherein:
   a lateral edge of the insulating layer has a longer distance to a lateral edge of the substrate on a same side of the touch panel than a lateral edge of the black matrix layer on the same side of the touch panel; and
   a distance between the lateral edge of the insulating layer and the lateral edge of the black matrix layer is around 20-50 µm.

2. The touch panel of claim 1, wherein a thickness of the insulating layer is around 1.3-1.7 µm.

3. The touch panel of claim 1, further comprising a protecting layer over the insulating layer, wherein:
   a lateral edge of the protecting layer on the same side of the touch panel has a longer distance to the lateral edge of the substrate than the lateral edge of the insulating layer.

4. The touch panel of claim 3, wherein a distance between the lateral edge of the protecting layer and the lateral edge of the insulating layer is around 20-60 µm.

5. The touch panel of claim 3, wherein a thickness of the protecting layer is around 1.3-1.7 µm.

6. The touch panel of claim 3, wherein the protecting layer is configured to be resistant to hydrofluoric acid solution.

7. The touch panel of claim 1, further comprising a flattening layer on the black matrix layer and below the insulating layer, wherein:
   the flattening layer is configured to provide a flattened surface over the black matrix layer to thereby allow for formation of another film layer thereon.

8. A display apparatus, comprising a touch panel according to claim 1.

9. A method for manufacturing the touch panel of claim 1, the method comprising:
   providing the substrate;
   forming the black matrix layer over the substrate; and
   forming the insulating layer over the black matrix layer, such that the edge of the insulating layer has a longer distance to the edge of the substrate on a same side of the touch panel than the edge of the black matrix layer on the same side of the touch panel.

10. The method according to claim 9, further comprising:
    forming a protecting layer over the insulating layer, such that a lateral edge of the protecting layer on the same side of the touch panel has a longer distance to the lateral edge of the substrate than the lateral edge of the insulating layer.

11. The method according to claim 10, further comprising, between the forming an insulating layer over the black matrix layer and the forming a protecting layer over the insulating layer:
    forming a blanking layer over the insulating layer such that the blanking layer covers the lateral edge of the insulating layer and the lateral edge of the black matrix layer, and that a lateral edge of the blanking layer on the same side of the touch panel has a shorter distance to the lateral edge of the substrate than the lateral edge of the black matrix layer.

12. The method according to claim 11, wherein in the forming a blanking layer over the insulating layer:
    the edge of the blanking layer is substantially flush with the lateral edge of the substrate.

13. The method according to claim 9, between the forming a black matrix layer over the substrate and the forming an insulating layer over the black matrix layer, the method further comprises:
    forming a flattening layer on the black matrix layer, wherein the flattening layer is configured to provide a flattened surface over the black matrix layer to thereby allow for formation of another film layer thereon.

14. A touch panel, comprising:
    a substrate;
    a black matrix layer over the substrate; and
    an insulating layer over the black matrix layer;
    wherein:
    a lateral edge of the insulating layer has a longer distance to a lateral edge of the substrate on a same side of the touch panel than a lateral edge of the black matrix layer on the same side of the touch panel;
    the touch panel further comprising:
    a protecting layer over the insulating layer, wherein a lateral edge of the protecting layer on the same side of the touch panel has a longer distance to the lateral edge of the substrate than the lateral edge of the insulating layer; and
    a blanking layer between the insulating layer and the protecting layer, wherein:
    the blanking layer is configured to cover the lateral edge of the insulating layer and the lateral edge of the black matrix layer such that a lateral edge of the blanking layer on the same side of the touch panel has a shorter distance to the lateral edge of the substrate than the lateral edge of the black matrix layer; and the lateral edge of the blanking layer is substantially flush with the lateral edge of the substrate.

15. The touch panel of claim 14, wherein a thickness of the blanking layer is around 850 Å-950 Å.

16. The touch panel of claim 14, wherein the blanking layer has a composition of silicon oxynitride.

* * * * *